Figure 1:
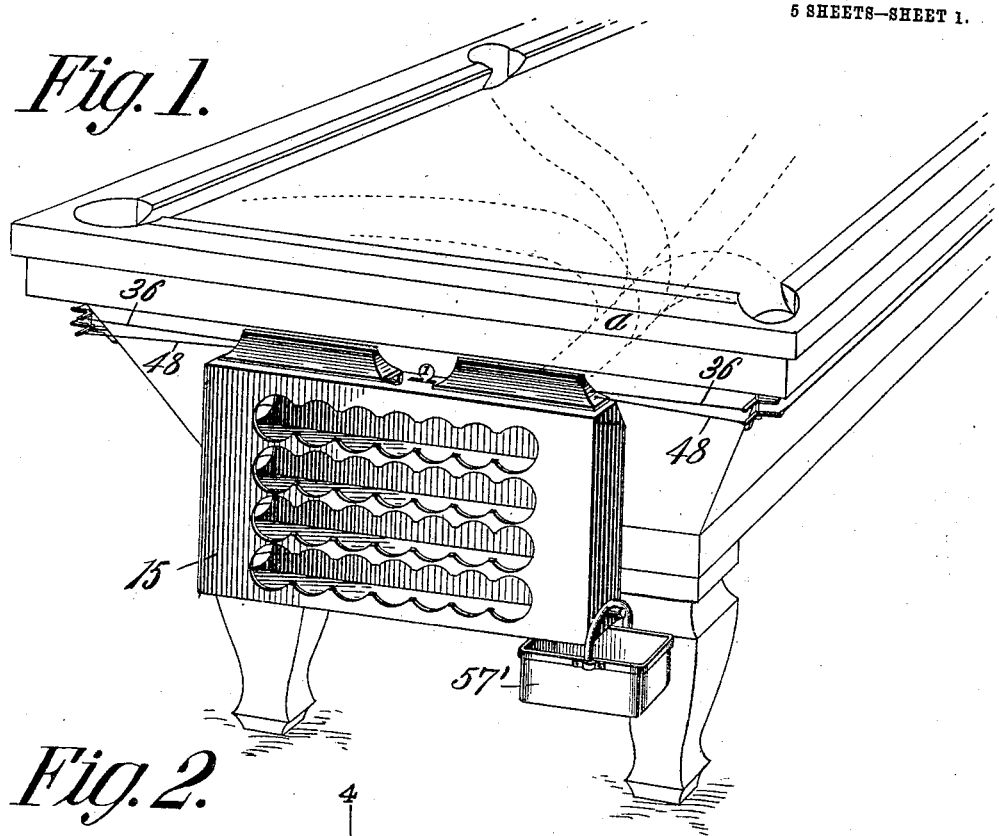

No. 868,427.  
PATENTED OCT. 15, 1907.

G. F. GOSS.  
POOL BALL RACK.  
APPLICATION FILED NOV. 12, 1906.

5 SHEETS—SHEET 1.

WITNESSES:  
E. F. Stewart  
Jno. E. Parker

George F. Goss, INVENTOR.  
By C. A. Snow & Co.  
ATTORNEYS

No. 868,427.
PATENTED OCT. 15, 1907.
G. F. GOSS.
POOL BALL RACK.
APPLICATION FILED NOV. 12, 1906.
5 SHEETS—SHEET 2.
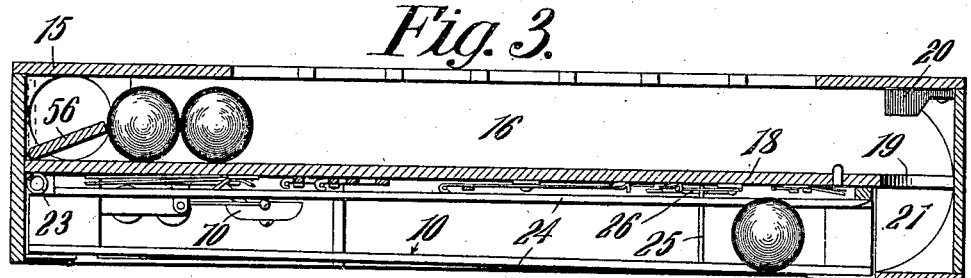
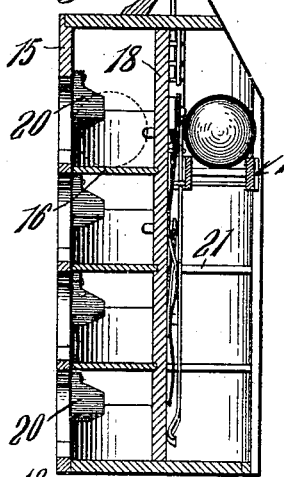
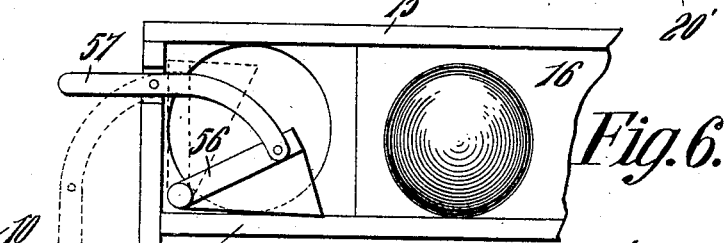
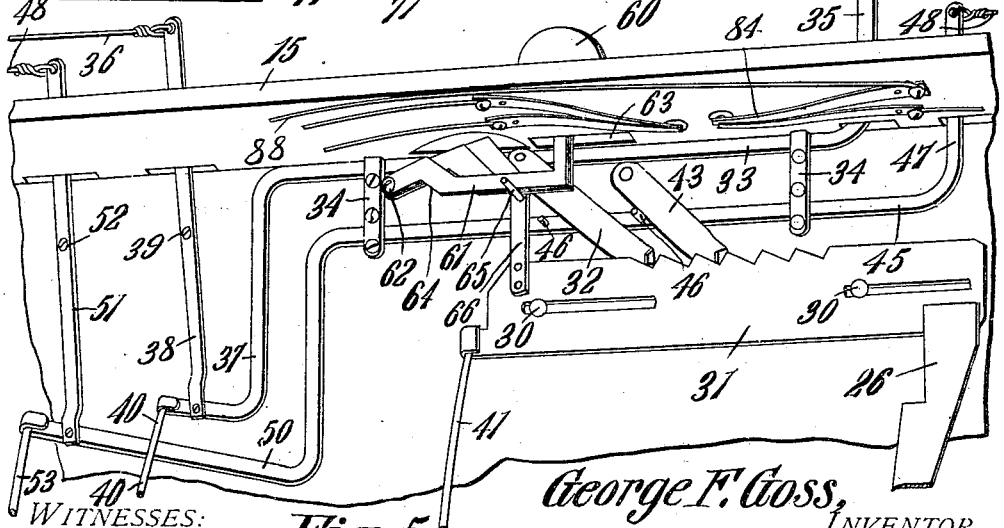
George F. Goss, INVENTOR
WITNESSES:
By C. A. Snow & Co.
ATTORNEYS No. 868,427. PATENTED OCT. 15, 1907.
G. F. GOSS.
POOL BALL RACK.
APPLICATION FILED NOV. 12, 1906.

5 SHEETS—SHEET 3.

WITNESSES:

George F. Goss,
INVENTOR.
By
ATTORNEYS

No. 868,427.

PATENTED OCT. 15, 1907.

G. F. GOSS.
POOL BALL RACK.
APPLICATION FILED NOV. 12, 1906.

5 SHEETS—SHEET 4.

WITNESSES:

George F. Goss, INVENTOR.
By
ATTORNEYS

No. 868,427.

PATENTED OCT. 15, 1907.

G. F. GOSS.
POOL BALL RACK.
APPLICATION FILED NOV. 12, 1906.

5 SHEETS—SHEET 5.

WITNESSES:

George F. Goss,
INVENTOR.

ATTORNEYS

UNITED STATES PATENT OFFICE.

GEORGE FRANK GOSS, OF WALLACETON, PENNSYLVANIA.

POOL-BALL RACK.

No. 868,427.

Specification of Letters Patent.

Patented Oct. 15, 1907.

Application filed November 12, 1906. Serial No. 343,073.

*To all whom it may concern:*

Be it known that I, GEORGE FRANK GOSS, a citizen of the United States, residing at Wallaceton, in the county of Clearfield and State of Pennsylvania, have invented a new and useful Pool-Ball Rack, of which the following is a specification.

This invention relates to devices of that class employed in connection with pool tables for automatically collecting the balls as the latter are driven into the pockets.

One of the principal objects of the invention is to provide a device of very simple and cheap construction which may be readily attached to existing pool tables without any change in the construction of the latter, and without the necessity of employing special mechanical skill.

A further object of the invention is to provide a device of this class in which the balls pocketed by different players may be collected into separate compartments by means of a ball guiding device that may be readily adjusted from time to time during the progress of the game.

A still further object of the invention is to provide a device of this class in which substantially horizontal compartments are arranged in superposed order so that balls may be collected without danger of injury such as frequently occurs where the balls drop into vertically arranged compartments.

A still further object of the invention is to provide a ball collecting device having a number of superposed compartments, and a guiding member which is adjustable to direct the balls into any one of such compartments.

A still further object of the invention is to provide a device of this type in which the ball guiding device is depressed by the weight of the ball running thereover, provision being made for limiting the downward movement of said guiding device in accordance with the compartment into which the ball is to be directed.

A still further object of the invention is to provide a collecting rack having means for preventing the return movement of the balls.

A still further object of the invention is to provide a collecting rack including a number of compartments having ball discharge openings at one end, in connection with means for holding the balls within the compartments or permitting their gravitational discharge therefrom.

A still further object of the invention is to provide a novel means for adjusting the downward movement of the ball guiding device.

A still further object of the invention is to provide a device of this class in which the alarm mechanism and circuits are so arranged as to permit the playing of a game by two or more players without sounding the alarm in the latter case when eight balls have been pocketed.

A still further object of the invention is to provide a device of this class in which the adjusting mechanism is so arranged as to move to display position a signal 60 on which the number of the player is displayed.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

Figure 2:
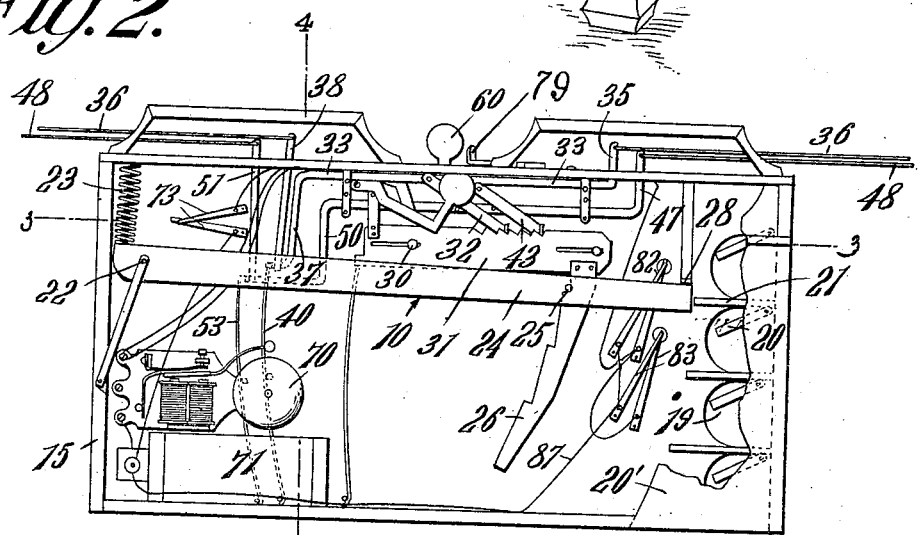
Figure 8:
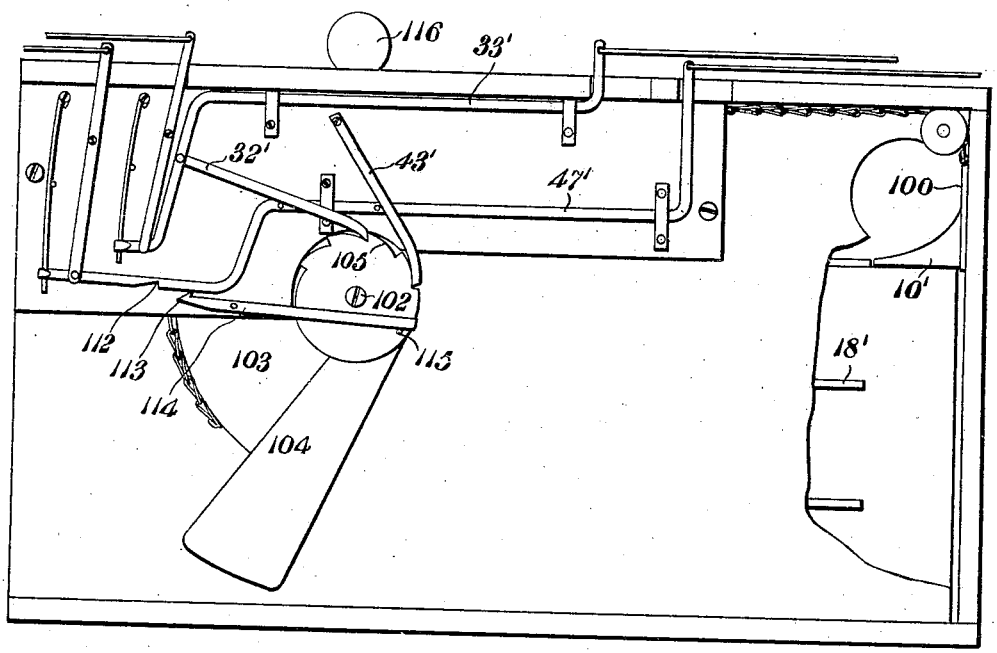
Figure 9:
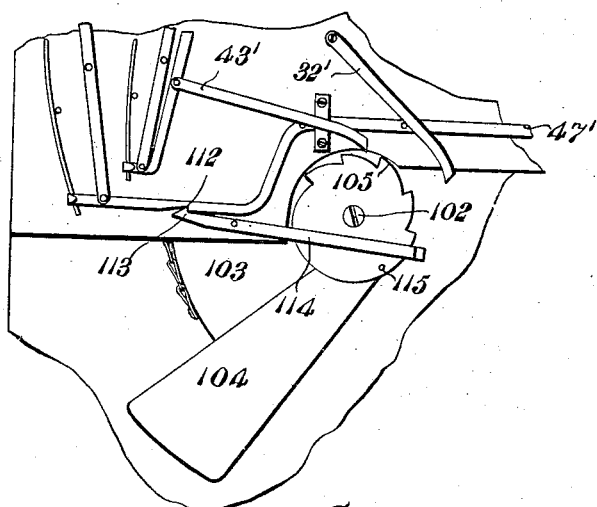
Figure 10:
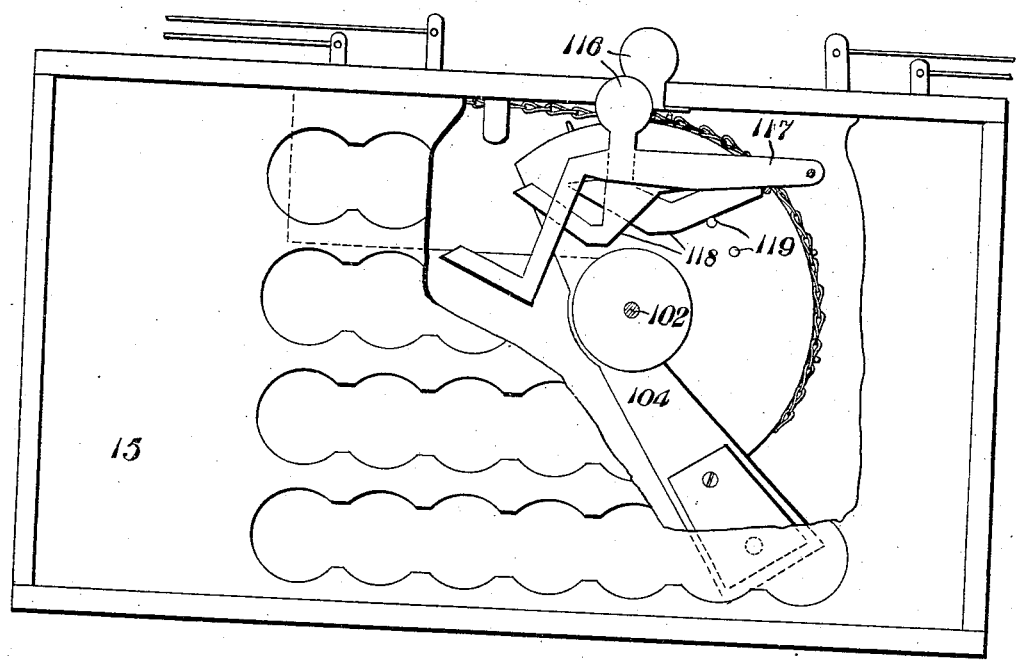
Figure 11:
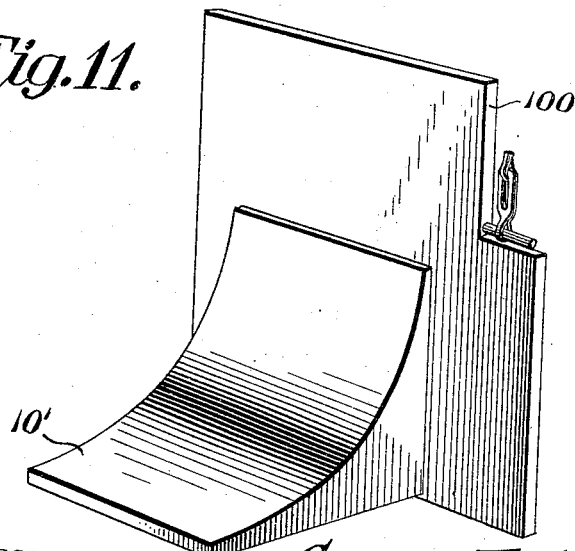
Figure 12:
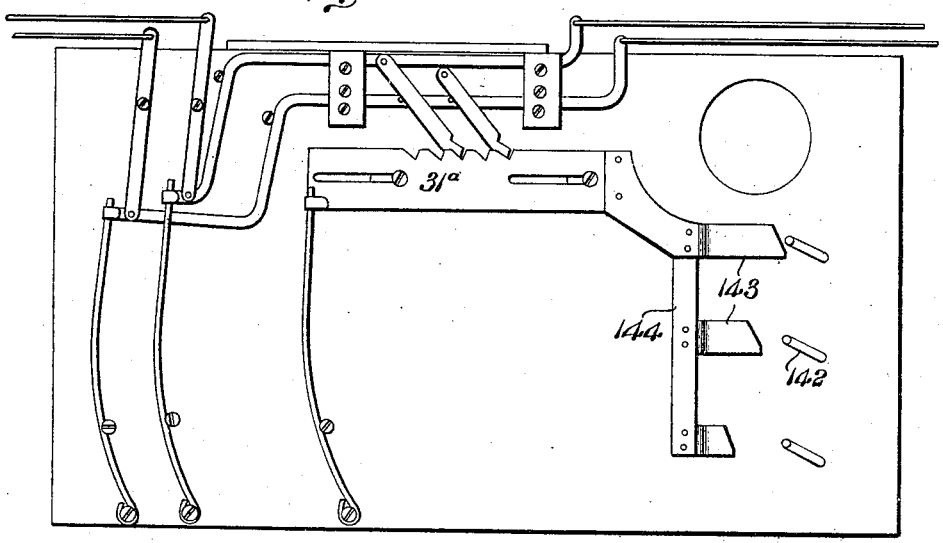
Figure 13:
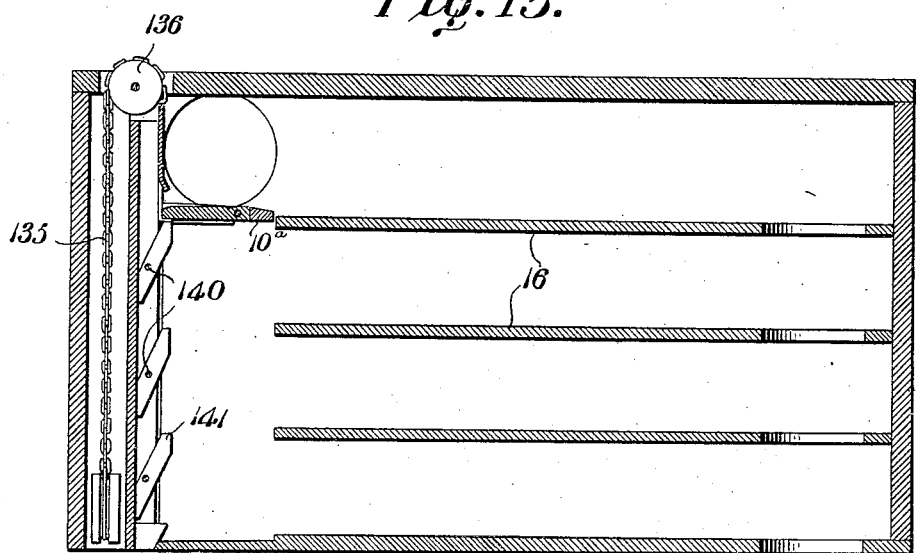
Figure 14:
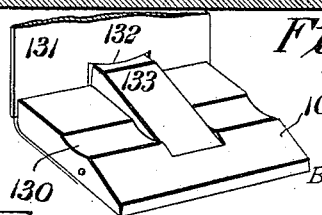

In the accompanying drawings:—Figure 1 is a perspective view of one end of a pool table provided with a ball collecting rack constructed in accordance with the invention. Fig. 2 is a rear elevation of the rack detached. Fig. 3 is a sectional plan view of the rack on the line 3—3 of Fig. 2, the view being on a somewhat larger scale. Fig. 4 is a vertical section of the rack on the line 4—4 of Fig. 2. Fig. 5 is a perspective view looking at the rear upper portion of the rack. Fig. 6 is a detail view on an enlarged scale of the holding and discharge gate. Fig. 7 is a diagram of the electrical connections. Fig. 8 is a rear elevation illustrating a slight modification of the rack. Fig. 9 is a detail view of a portion of the same showing the pawls moved to release position. Fig. 10 is a front elevation, parts being broken away in order to clearly illustrate the construction. Fig. 11 is a detail perspective view of a guide used in the construction shown in Figs. 8, 9 and 10. Fig. 12 is a rear elevation illustrating a still further modification of the invention. Fig. 13 is a sectional view of the same. Fig. 14 is a detail perspective view of the movable ball guide.

Similar numerals of reference are employed to indicate corresponding parts through the several figures of the drawings.

The apparatus forming the subject of the present invention is intended to be attached to the end of a pool table, and is so arranged that the balls from the various pockets will be conducted through a runway or runways *a* into the upper rear portion of the rack, the balls being directed into the various compartments.

In one form of the invention the balls enter on a pivoted runway 10 by which they are guided to the compartments, but this runway or guide may be slidably mounted or otherwise supported.

In the construction shown in Figs. 1 to 7, the casing 15 is approximately rectangular in form and is divided by horizontally disposed partitions 16 into any desired number of compartments, four of which are shown in the present instance, although the number may be increased or diminished. These partitions serve as supports for the balls, and the latter are displayed through openings which are formed in the front wall of the casing, said openings being of such construction as to permit the ready removal of a ball from any compartment in case it becomes necessary to "spot" said ball during the progress of the game.

The ball receiving compartments are divided from the rear of the casing by a vertically disposed partition 18 that is provided at one end with openings 19 through which the balls enter the various compartments, and as the balls enter these compartments they pass under and raise small retaining pawls 20 which immediately fall after the passage of the balls to such position as to prevent return movement of the latter through said openings. The casing also includes a rear vertical wall 20' which, in connection with the end of the casing and the partition 18 serves to support shelves 21 in horizontal alinement with the horizontal partition 16, these shelves receiving the balls from the run-way or guide 10 and the momentum of the balls carrying them over the shelves and through the openings 19 into the various compartments.

The guide or run-way 10 previously referred to is mounted on a pivot pin 22 and normally is held in the elevated position shown in Fig. 2 by means of a helical compression spring 23. This guide or run-way is formed of a pair of parallel side arms 24 connected at intervals by cross braces and carrying a pin 25, which in connection with a toothed stop arm 26, determines the extent of downward movement of said guide or run-way. Under normal conditions the guide or run-way is in the position shown in Fig. 2, that is to say, in alinement with the uppermost shelf 21, and any balls which enter the guide will be directed on to said shelf, and thence in to the uppermost compartment which belongs to player No. 1. When player No. 1 fails, the stop arm 26 is adjusted so that the pin 25 may drop to the next tooth of the stop arm under the weight of the ball, and any ball pocketed by the second player will be directed into compartment No. 2. In similar manner the stop arm is adjusted to permit the guide to descend to such position as to direct the balls pocketed by the third player into compartment No. 3, and so on. After each depression of the guide by the weight of a ball, the guide is restored to its elevated position by the spring 23, suitable buffers 28 of yieldable material being employed at the free end of the guide to lessen the jar and shock.

The rear wall of the vertical partition 18 is provided with projecting studs 30 which pass through horizontally disposed slots formed in a rack bar 31, said rack bar carrying the toothed stop arm 26 previously described. With this rack arm engages a pawl 32, that is pivoted on a bar 33, the latter being slidably mounted in suitable guides 34 that are secured to the partition. One end of the bar 33 is turned upward, forming an arm 35 that is connected to a flexible cord or chain 36 that extends around the table in such position that it may be pulled by the players. The other end of the bar is turned downward forming an arm 37 to which is connected the lower end of a lever 38 that is pivoted at 39, the upper end of said lever being connected to the cord or chain 36 and any pull of the cord from any point around the table and in either direction will cause the pawl to advance the rack bar one step, and thus allow the descent of the ball guide 10 in order that it may direct the balls pocketed by the player into the proper compartment. The arm 37 is engaged by a spring 40 which is placed under stress at each movement of the pawl, said spring serving to restore the bar to initial position after each operation.

The rack bar is engaged by a similar spring 41 that tends to move it toward the left of Fig. 2, but its movement is resisted by a locking pawl 43 which holds the rack bar in adjusted position.

As each player fails, the cord or chain 36 is pulled and the rack bar is advanced to the extent of a single tooth, thus carrying the toothed stop arm 26 forward, so that the ball guide may descend for the purpose of guiding the ball to the next lowermost compartment.

At the completion of the game, or after the last player has failed, and the shot belongs to No. 1 player, it becomes necessary to restore the rack bar to the initial position. For this purpose an additional release bar 45 is employed, said bar being mounted in the guides 34 and being provided with a pair of pins 46 which engage with the two pawls and move the same from engagement with the rack bar, so that the spring 41 may move the latter to the initial position. This bar 45 is provided at one end with an upturned arm 47 which is connected to a flexible chain or cord 48. The opposite end of the bar has an angularly bent arm 50 which is connected to the lower arm of a lever 51 which is pivoted on a stud 52, the upper end of the lever being connected to the cord or chain 48, and this cord or chain also extends around the table, so that it may be operated by a player at any point. This bar is engaged by a spring 53 which tends to restore it to initial position after the strain on the cord or chain is relieved.

The partitions 16 on which the balls rest are arranged at a slight incline, so that the balls tend to run toward the discharge ends of said partitions, but while the balls are being collected in the compartments, they are prevented from running past the ends of the partitions by a pivoted gate 56, the latter being normally in the position indicated in full lines in Fig. 3. When the game is finished, an arm 57, (Fig. 6), that is connected to the gate, is pulled over to the dotted line position, and the balls fall by gravity through the bottom discharge opening into a collecting drawer or basket 57', so that they may be readily placed on the table for the starting of another game.

In order to display the number of the player and the position to which the ball guide is adjusted, a suitable indicating mechanism is employed, this in the present instance comprising a number of disks 60, there being one of such disks in each compartment. The first disk, which bears the numeral 1, is rigidly secured to the casing. The other disks are carried by angularly bent arms 61 pivoted on a stud 62, the arms extending up through a suitable slot 63 in the upper portion of the casing. These arms are provided with cams 64 that are arranged to be engaged by a pin 65 projecting from the arm 66 that is carried by the rack bar 31. The cams are arranged in successively advancing steps, so that as the rack bar moves from one position to the other the pin will successively engage with the cams and will successively move the disks up to display position, disk No. 2 being exposed to view when the ball guide is free to move to direct the balls of player No. 2 into the second compartment, and then disk No. 3 moves in front of disk No. 2, and so on through the entire series of disks.

It has been found desirable in devices of this class to make some announcement, or to register or record the entrance of each ball into the rack, and in the present case an ordinary electric bell 70 is placed within the casing and is connected to a dry battery 71. At a point above the ball guide, and in position to be engaged by each ball as it passes from the table run way $a$ is a pair of contacts 73 which when struck by the ball will be engaged with each other, and will close a circuit which may be traced from the battery through a wire 74, contact 73, a pair of contacts 75, wire 76, and bell 70 and wire 77 to return battery. The two contacts 75 are under the control of a push button 78 which may be depressed by an operating lever 79 that is in convenient position to be moved by the attendant when racking the balls. If this lever is moved to engage the push button, the circuit is closed, and as each ball enters the rack the bell will ring. Provision is also made for announcing the completion of a game between two players, and for this purpose two buttons 80 are arranged in the vertical partition, the buttons extending through said partition in position to be engaged by all of the balls which enter the first and the second compartments. At the rear of the button of the first compartment is a pair of contacts 82, and at the rear of the button of the second compartment is a pair of contacts 83. At the upper portion of the casing is a pair of contacts 84 which are under the control of a push button 85 which latter is engaged by the lever 79, the attendant moving the lever so that it will engage this button 85 and move from engagement with the button 78 when two players only are using the table.

When two players only are engaged, the circuit under the control of the contacts 73 is cut out, and when a ball enters compartment No. 1, it depresses the push button 80, and the latter engages the contacts 82, thus closing a circuit which may be traced from the battery 71, wire 86, one of the contacts 83, contacts 82, wire 87, contacts 84, wire 88, the electric bell, wire 77, to battery. In similar manner when a ball enters compartment No. 2, the contacts 83 are engaged and a circuit is closed in similar manner.

The two buttons 80 are so located in the rack that when either compartment contains eight balls, which ordinarily completes a two handed pool game, the eighth ball will rest against the button, and the circuit will be held closed, and the bell will ring continuously, so that the attendant will know that the game has been finished.

Each of the compartments may be made of such length as to contain the whole fifteen balls, but this will not usually be necessary, but in the event of a single player pocketing all fifteen balls, there is no danger of the balls falling within the rear portion of the casing if the compartment is not long enough to contain them.

It will be seen that the ball guide is held from downward movement by the teeth of the stop bar 26, and if the guide is directing balls into any compartment and that compartment becomes filled, the remaining balls will collect on the guide, and then when the discharge gate 56 is moved to open position, the balls will run by gravity through the compartment and from the guide into and through such compartment to the discharge gate.

In the construction illustrated in Figs. 8 to 11, the arrangement of the compartment remains substantially the same as previously described, but the guide instead of being pivoted, is arranged to move vertically, provision being made for stopping the guide at a point adjacent to each of the horizontal partitions which divide the compartments from each other.

The partitions terminate short of the entrance end of the compartments, and in the space thus formed is arranged a vertically movable guide 10′ which in this instance is in the form of an arcuate block carried by a suitable base plate 100 that is adapted to guideways formed in the end of the rack casing. This guide is arranged to move to such position as to guide the balls into any one of the compartments, provision being made for stopping the guide first at compartment No. 1, then at compartment No. 2, and so on, and the balls fall by gravity from the table runway into contact with the guide, and thence are deflected into the compartment in which they belong.

The rear portion of the casing is provided with a short shaft or stud 102 on which is mounted a segment 103 carrying a weight 104 which tends to maintain the guide 10′ in its elevated position, that is, in alinement with the uppermost of the horizontal partitions 18′. The hub of the segment is provided with ratchet teeth 105 which are arranged to be engaged by two pawls 32′ and 43′, the pawl 43′ being a lock pawl, and the pawl 32′ being carried by a bar 33′ which is suitably connected to the operating devices extending around the table as previously described.

Each time the bar 33′ is moved, the segment 103 is turned to the extent of a single tooth, and the guide 10′ is lowered into alinement with the next lowermost partition, the segment being retained in this position by the lock pawl 43.

Arranged in suitable guides at the rear of the casing, is a slidable bar 47′ carrying pawl lifting pins of the character previously described, and arranged to be operated by the cords or other flexible members that extend around the table. This bar 47′ is provided with a notch 112 that is arranged to be engaged by a catch 113 arranged at one end of a lever 114, one end of which is disposed in the path of movement of a pin 115 that is carried by the head of the segment 103.

The operation of this device is almost identical with that previously described, the operator pulling on the bar 33′ and advancing the segment step by step, so that the guide 10′ will be lowered into alinement with the successive partitions.

After the balls of the last player have been directed into the proper compartment, and it is desired to restore the guide into alinement with the first partition, the bar 47′ is pulled, and when moved forward, the catch 113 enters the catch 112, and retains the bar in the position to which it is adjusted. The pawls are thus locked in idle position until the segment moves back to its lowest position, and immediately before arriving at this position, the pin 115 engages the lever 114 and moves the catch to release position, so that the bar 47 may be moved to allow the pawls to again engage with the ratchet teeth.

In order to display the numbers of the players, the numbers are arranged on small disks 116 which are carried by levers 117 having cam faces 118 arranged at successively advancing positions with respect to an operating pin or pins 119 carried by the segment. When the segment advances a single step, a pin will engage with one of the levers 117 and will move the display rack of No. 1 player to position above the top of the casing. When the segment is advanced another step, the second lever will be engaged in order to move the second disk to display position, while the lever of the first disk is disengaged and allowed to fall.

The apparatus may of course be employed in connection with a registering or recording device of any suitable character for the purpose of making a record of the number of balls pocketed and the amount to be paid for the game.

In Figs. 12, 13 and 14 is illustrated a further modification of the invention, where the frame and the horizontal partitions 18 are similar to those previously described. Near one end of the casing is an opening through which the balls enter from the table run-way and in alinement with this opening is a vertically movable ball guide 10ª, said guide being in the form of a plate, the upper face of which is provided with a groove 130, and at the rear edge of the plate is a vertically extended strip 131 having a slot 132 to receive the rear end of a pivot bar 133 which may be moved upward to the position indicated in Fig. 13 for the purpose of throwing off a ball supported by the guide and directing such ball on to any one of the horizontal partitions 16. The ball guide is carried by a counter-balanced chain or cord 135 which runs over a sheave 136 supported by the frame, the counter-weight being sufficient to move the ball guide to the position indicated in Fig. 13, the upper edge of the guide being then in alinement with the lower edge of the openings through which the ball enters, and the weight of the ball being sufficient to move the guide downward. The casing is provided with a series of pivot bars 140 on which are mounted stop pawls 141, disposed in the path of movement of the pivot bar 133. The outer ends of the pivot bars are provided with cranked arms 142 which are arranged to be engaged by a series of stepped cams 143 that extend from an arm 144 carried by a slidable rack bar 31ª which receives movement from the pawl mechanism previously described.

The normal position of the parts, when player No. 1 is in action, is indicated in Figs. 12 and 13, the ball guide 10ª being supported in a position opposite the uppermost partition 16 and when a ball enters through and rolls over the guide 10ª, the latter will be slightly depressed by the weight of the ball while downward movement of the bar 133 will be checked by the pawl 141, so that said bar 133 will assume the angular position shown in Fig. 14, and the ball will be thrown from the guide 10ª into the uppermost compartment.

When player No. 1 starts, the rack bar 31ª is advanced one step, and the uppermost of the cams 143 engages the uppermost crank 142, and turns the uppermost pawl 141 to indicate the position. The guide 10ª will be retained in the uppermost position by the counter-weight, until a ball is received thereon, and then the guide will move downward until it engages the second pawl 140, whereupon the bar 133 will be held upward and will discharge the ball into the second compartment. The next movement of the rack bar 31ª will cause the second pawl to be moved to inoperative position, and so on, there being as many cams and pawls as there are compartments, although, of course, it is not necessary to use a movable pawl in connection with the lowermost compartment.

All of the devices described may be employed in connection with electrical registering or indicating mechanism for the purpose of indicating the number of players, the end of the game, and the amount due for each game.

I claim:—

1. A pool ball rack having ball receiving compartments, and a single ball guiding member adjustable to direct balls into all of said compartments.

2. A pool ball rack having ball receiving compartments, a ball guiding member movable by the weight of a ball to direct the latter into any compartment, and an adjusting means for limiting the movement of the guiding member.

3. A pool ball rack having ball receiving compartments, a pivotally mounted ball guiding member for directing balls into any of the compartments, and means for determining the extent of movement of said guiding member.

4. A pool ball rack having ball receiving compartments, a pivotally mounted guiding member for directing balls into any of said compartments, said guiding device being movable by the weight of a ball, and an adjustable means for determining the extent of movement of said guiding device.

5. A pool ball rack having ball receiving compartments, a pivotally mounted ball guide for directing the balls into any of said compartments, said guide being movable under the weight of a ball, and a manually adjustable means for determining the extent of movement of said guide.

6. A pool ball rack having ball receiving compartments, a pivotally mounted guide for directing the balls into said compartments, said guide being movable under the weight of a ball, and means for restoring the guide to initial elevated position after the delivery of each ball.

7. A pool ball rack having ball receiving compartments, a pivotally mounted ball guide movable under the weight of a ball and arranged to deliver balls into any compartment.

8. A pool ball rack having ball receiving compartments, a pivoted guide for directing the balls into any of the compartments, a pin or lug projecting from the guide, a toothed stop arm with which said pin may engage, and means for effecting a step by step movement of said arm.

9. A pool ball rack having compartments for the reception of the balls, a guide for directing the balls into such compartments, said guide being movable under the weight of a ball, means for restoring the guide to initial elevated position after the passage of each ball, a pin or lug projecting from the guide, a toothed stop arm with which said pin or lug may engage, and means for effecting a step by step movement of said stop arm.

10. A pool ball rack having ball receiving compartments, a pivoted guide adjustable to direct balls into any compartment, said guide being arranged to move downward under the weight of a ball, a toothed stop arm, a rack bar carrying the same, a manually operable pawl engaging said rack bar, and means on the guide for engaging said toothed arm.

11. A pool ball rack having ball receiving compartments, a pivoted guide for directing the balls into any of said compartments, a pin or lug projecting from the guide, a toothed stop arm with which said pin or lug may engage, a rack bar carrying the arm, a pawl engaging the arm, a pawl carrying rack bar, a carrying bar for the pawl, arms extending from the bar, and an operating means engaging the arms.

12. A pool ball rack having ball receiving compartments, a pivoted guide for directing balls into said compartments, a pin or lug projecting from said guide, a toothed stop arm with which said pin or lug engages when the guide is depressed, a slidable rack bar carrying said arm, a pawl for effecting step by step movement of the rack bar in one direction, means for operating the pawl, a spring engaging the rack bar and tending to resist movement of the pawl, and means for moving the pawl from engagement with the rack bar to permit the return of said rack bar and arm to initial position.

13. A pool ball rack having ball receiving compartments, a pivoted guide for directing the balls into said compartments, said guide being depressible by the weight of the ball, a pin or lug projecting from the guide, a toothed stop arm with which said pin or lug engages, a slidable rack bar carrying the arm, a pawl for actuating said rack bar, a carrying bar for the pawl, a locking pawl engaging the rack bar, a slidable bar having a projection for engaging both pawls, and flexible connections for operating both bars.

14. A pool ball rack having ball receiving compartments, a movable ball guide for directing the balls into said compartments, a flexible means arranged to extend around the table and controlling the adjustment of the guide.

15. In apparatus of the class described, a pool ball rack having ball receiving compartments, an adjusting means for guiding the balls into any of the compartments, and means for controlling such adjustment, said means being arranged to extend around the pool table.

16. A pool ball rack having ball receiving compartments, an adjustable guide for directing the balls into such compartments, and means for indicating the operative position of the guide.

17. A pool ball rack having ball receiving compartments, an adjustable guide for directing the balls into said compartments, a manually operable means controlling the adjustment, and means for indicating the operative position of said guide.

18. A pool ball rack having ball receiving compartments, an adjustable guide for directing the balls into said compartments, a toothed stop arm for controlling the extent of movement of the guide, a rack bar carrying said arm, means for effecting a step by step movement of the bar, a plurality of indicating disks, pivoted arms carrying said disks, said arms having cams, and the cams being disposed in successive order, and means on the rack bar for engaging said cams and moving the successive disks to display position.

19. A pool ball rack having ball receiving compartments, an adjustable guide for directing the balls into such compartments, and an electrical alarm having ball closed contacts arranged at the entrance end of the guide.

20. A pool ball rack having ball receiving compartments, a pivoted guide for directing the balls into such compartments, an electrical alarm, a source of energy, circuits connecting the source of energy and the alarm, a controlling switch for rendering one or other of the circuits operative, ball actuated contacts arranged in two of the contacts and connected in one of the circuits, and ball actuated contacts arranged in the other circuit and disposed at the entrance end of the guide.

In testimony that I claim the foregoing as my own, I have hereto affixed my signature in the presence of two witnesses.

GEORGE FRANK GOSS.

Witnesses:
 HARRY BYERS,
 GEORGE K. MCGILL.